United States Patent Office 3,576,851
Patented Apr. 27, 1971

3,576,851
1-PROPION-AMIDO-4-(3-PROPOXY-SODIUM SULFONATE)-BENZENE
Albert René Joseph Castaigne, Toulouse, France, asignor to Centre d'Etudes pour l'Industrie Pharmaceutique, Toulouse, France
No Drawing. Filed Apr. 29, 1968, Ser. No. 725,160
Claims priority, application France, May 16, 1967, 106,530
Int. Cl. C07c *143/58*
U.S. Cl. 260—507          1 Claim

ABSTRACT OF THE DISCLOSURE

New 1-propionamido-4-(3-propoxy-sodium sulfonate)-benzene of formula:

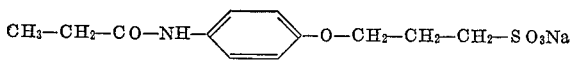

having antalgic, anti-inflammatory and anti-pyretic properties. This compound is prepared by reacting 1-propionamido-4-hydroxy-benzene with propane sultone in the presence of sodium hydroxide.

---

The present invention has for its object a new propionamido-benzene derivative, 1-propionamido-4-(3-propoxy-sodium sulfonate)-benzene, of formula:

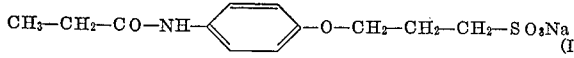
(I)

having, in particular, antalgic, anti-inflammatory and anti-pyretic properties.

It is also concerned with a process for the preparation of this compound, comprising reacting 1-propionamido-4-hydroxy-benzene with propane sultone in the presence of sodium hydroxide and collecting the resulting precipitate. Preferably, an aqueous sodium hydroxide solution is first added to an alcoholic (such as ethanolic) solution of 1-propionamido-4-hydroxy-benzene and a solution of propane sultone in an alcohol (preferably ethanol) is then introduced at room temperature. The precipitated compound of Formula I is then separated by filtration or suction filtering.

The following nonlimitative example illustrates the process of the invention.

EXAMPLE

In 350 ml. of 95% ethanol, 165 g. (1 molecule) of 1-propionamido-4-hydroxy-benzene are dissolved in the hot. The solution is then cooled to 15–20° C. and 40 g. of sodium hydroxide (1 molecule) dissolved in 120 ml. of water are then added thereto with constant stirring and with cooling.

A solution of 122.14 g. of propane sultone in 150 ml. of 95% ethanol is then immediately poured over the mixture.

The solution warms slowly, thickens and eventually sets to a mass.

After cooling and suction filtering, the pure desired product is obtained on recrystallization from 95% ethanol.

1-propionamido-4-(3-propoxy-sodium sulfonate)-benzene has the appearance of a white crystalline powder, soluble in water, acids and bases, insoluble in alcohol and chloroform.

It may be identified, after nitrosation, by addition of alpha-naphthol in sodium hydroxide medium which develops a red-brown colour. It may also be characterized by its ultraviolet absorption spectrum, maximum absorption of an aqueous 1-propionamido-4-(3-propoxy-sodium sulfonate)-benzene solution at 10 γ/ml. occurring at a wavelength of 245 m$\mu$.

Titration may be effected by determination of total nitrogen according to the technique of Parnass-Wagner, after mineralization of the material.

The invention is also concerned with a therapeutical composition composing 1-propionamido-4-(3-propoxy-sodium sulfonate)-benzene and a pharmaceutically acceptable vehicle.

The composition according to the invention is generally formulated for oral administration in unit dosage form such as coated tablets, tablets, capsules, and in the form of syrup. It is also formulated for parenteral administration in the form of injectable solute or of injectable freeze-dried preparation, and, for rectal administration, in the form of suppositories.

Each unit dose contains advantageously about 0.100 to 1 g. of active compound.

In the various pharmaceutical forms, the active compound is associated with the usual excipients, suitable for the various routes of administration.

The administrable dose varies with the case to be treated and the pharmaceutical form selected. It is advantageously comprised between 0.200 g. and 3 g. of active compound per 24 hours.

Eight formulations of coated tablets, tablets, capsules, syrup, injectable solute, injectable freeze-dried preparation and suppositories of the composition according to the invention are given below as nonlimiting examples.

FORMULATION No. 1.—COATED TABLETS

| | Grams |
|---|---|
| Core: | |
| 1-propionamido-4(3-propoxy-sodium sulfonate)-benzene | 0.400 |
| Talc | 0.003 |
| Lactose | 0.010 |
| Magnesium stearate | 0.002 |
| Sodium carboxymethylcellulose | 0.005 |
| Coating: | |
| Talc | 0.040 |
| Shellac | 0.003 |
| Gum arabic | 0.003 |
| Wax | Trace |
| Glucose | 0.010 |

FORMULATION NO. 2.—TABLETS

| | G. |
|---|---|
| 1 - propionamido-4 (3-propoxy-sodium sulfonate)-benzene | 0.500 |
| Lactose | 0.005 |
| Maize starch | 0.010 |
| Magnesium stearate | 0.002 |
| Sodium carboxymethylcellulose | 0.005 |

FORMULATION NO. 3.—CAPSULES

| | |
|---|---|
| 1 - propionamido-4-(3-propoxy-sodium sulfonate)-benzene | 0.400 |
| Talc | 0.005 |
| Magnesium stearate | 0.005 |

FORMULATION NO. 4.—SYRUP

| | |
|---|---|
| 1-propionamido - 4 - (3-propoxy-sodium-sulfonate-benzene | g.. 5.000 |
| Sweetened and flavoured excipient | ml.. 100 |

FORMULATION NO. 5.—INJECTABLE SOLUTE

| | |
|---|---|
| 1 - propionamido-4-(3-propoxy-sodium sulfonate)-benzene | g.. 0.500 |
| Isotonic solute, q.s. to | ml.. 5 |

FORMULATION NO. 6.—INJECTABLE FREEZE-DRIED PREPARATION

Freeze-dried vial:

| | |
|---|---|
| 1 - propionamido-4-(3-propoxy-sodium sulfonate)-benzene | g.. 0.300 |

Solvent ampoule:

| | |
|---|---|
| Injectable isotonic solute | ml.. 4 |

FORMULATION NO. 7.—SUPPOSITORIES FOR ADULTS 1-propionamido - 4 - (3-propoxy-sodium-sulfonate-benzene _____ g__ 0.450
Semi-synthetic triglycerides, q.s. for 1 suppository.

FORMULATION NO. 8.—SUPPOSITORIES FOR CHILDREN

1 - propionamido-4-(3-propoxy-sodium sulfonate)-benzene _____ g__ 0.200
Semi-synthetic triglycerides, q.s. for 1 suppository.

The compound according to the invention has valuable therapeutical properties which will be demonstrated by the results of pharmacological and clinical tests given below together with toxicological tests.

(A) TOXICOLOGICAL INVESTIGATION

This investigation related to:

(1) acute toxicity,
(2) chronic and sub-chronic toxicity,
(3) delayed toxicity,
(4) local and systematic tolerance,
(5) methemoglobinizing action,
(6) potential teratogenic power, and had made it possible to find that, under the experimental conditions, the compound of the invention, on administration to rats, mice and rabbits, both by the oral and intraperitoneal or rectal routes, was perfectly tolerated. The outer appearance of the treated animals, their behaviour, the weight curves and the hemotological determinations systematically effected disclosed no anomaly.

The macroscopial and microscopical examinations carried out at the end of the experiment and thirty days later on the organs of autopsied animals did not make it possible to detect any trace of inflammation or of irritation.

Where teratogenic power is concerned, study of the descent up to the third generation disclosed no anomaly.

(B) PHARMACOLOGICAL INVESTIGATION (1) The antalgic action was demonstrated by three methods:

(a) Mechanical stimulation method, according to the technique of Haffner (Duetsch, Med. Wirsch., 1959, 55, 731.733) which comprises placing a forcipressure clamp at the base of a mouse's tail and recording the number of bites of the test animal, which, under the effect of pain, attempts to remove the clamp.

For each mouse, the number of bites is recorded per minute, prior and after administration of the test material. The decrease of the number of bites makes it possible to determine the percent antalgia produced, as a function of time.

The results are reported in Table I below:

TABLE I

| | Prior to treatment | After treatment— | | | |
| --- | --- | --- | --- | --- | --- |
| | | 30 min. | 1.25 hrs. | 2 hrs. | 3 hrs. |
| Average number of bites during 1 minute. | 11.5 | 3.1 | 3.4 | 4.5 | 4.8 |
| Antalgia, percent after treatment | | 73.1 | 70.5 | 60.9 | 58.2 |

(b) Thermal stimulation method (Jacob, Arch. Int. Pharm., 1952, 90, 301.319): the mice are placed in a cage the floor of which is maintained at 56° C.±1 with an electrical resistance coupled with a thermostat. The time during which the mice resist to the heat prior to licking their paws is recorded (latency time). Comparison of the latency times, prior and after administration of the test product, makes it possible to evaluate its analgesic activity.

It is found, from the results, that the antalgia percentages obtained are of 76.3% after the first hour, and of 62.9% after three hours.

(c) Acetic acid method, according to Koster, Anderson and Beer (Fed. Proced., 18, 1959, 412, 1, 626); intraperitoneal injection of a dilute acetic acid solution produces in mice characteristic and repeated extension movements. Administration of the drug according to the invention, 30 min. prior to the acetic acid injection, should cause a decrease, in the 30 min. that follow, of the number of such movements. The results show that the average number of painful reactions is of 54 in the reference lot, of 11 in the treated lot, and that the percent antalgia is equal to 80%.

(2) The anti-inflammatory and anti-oedematous action was investigated using three methods:

(a) Newbould test (British J. Pharm. Chemoth., 1963, 21, 127.136): localized oedema is produced in rat by the injection of a 3% Formalin solution (0.2 ml.) in the metatarsal flexor muscles of one paw. Treatment with the drug according to the invention is administered 3 hrs. prior to the Formalin injection, then simultaneously with the Formalin, and thereafter every 24 hrs., during 11 days. The oedema is evaluated two hours after each administration of the test product by measurements of the thickness of the cutaneous fold with Roch's micrometer.

By comparison with the untreated reference lot, the results show that the percentages of anti-inflammatory activity are 31% the first day, 40% the third day, 64% the seventh day and 78% the eleventh day.

(b) Cotton pellet test, according to Meier and coll. (Experientia, 1950, 6, 469): it comprises inducing an inflammatory granuloma by the implantation, in the dorsolumbar area on each side of the spine, of a previously weighed cotton pellet. The compound according to the invention is administered to the test animals by gastric intubation during 5 consecutive days.

The decrease in weight of the pellets of the treated lot, with respect to the reference lots, makes it possible to determine, after extraction of the granulomas, that the percent anti-inflammatory activity produced by the compound according to the invention is 51%.

(c) Method of the localized oedema induced by injection of 0.20 ml. of fresh undiluted ovalbumin in the metatarsal flexor muscles of the paw of rats. The compound according to the invention is administered preventively 16 hrs. and 1 hr. prior to the phlogogenous agent. The measurements of the thickness of the paw, effected prior and after ovalbumin injection, make it possible, by comparison with the untreated reference lot, to determine the percent anti-inflammatory activity produced by the compound.

It is found that such percentages are 22% after the first hour, 35% after the third hour, and 67% after the sixth hour.

(3) Antipyretic action: This action was investigated using two methods:

(a) Hazard's technique, which comprises effecting an experimental hyperthermia in rabbit by intravenous injection of antigonococcic vaccine. The compound according to the invention was administered to the test animals 30 minutes previously, and the rectal temperatures were recorded during the three hours that followed the pyrogenic injection, using stationary thermocouples.

The result are tabulated in the following Table II.

TABLE II

| | Prior to injection | After injection— | | |
| --- | --- | --- | --- | --- |
| | | 1 hr. | 2 hrs. | 3 hrs. |
| Reference lot, ° C | 37.1 | 38.3 | 38.5 | 38.2 |
| Treated lot, ° C | 37.2 | 37.8 | 37.4 | 37.3 |

(b) Sterilized hay infusion technique: administration, by the sub-cutaneous route, of a sterilized hay infusion produces a hyperthermia which sets in within 2 hours and does not vary during the 5 hours that follow.

The test material is administered by gastric intubation when this stationary temperature is reached, and maximum temperature decrease is recorded from this moment. It is found that the resulting hypothermia is of 1.2° C., on the average.

The data resulting from such tests show that the compound according to the invention:

(1) produces rapidly powerful and durable antalgic effects,
(2) possesses substantial anti-inflammatory and anti-oedematous properties,
(3) is endowed with substantial anti-pyretic effects.

The value of the compound according to the invention in human therapeutics is clearly apparent from this pharmacological investigation.

Its utility is demonstrated by the results of the clinical investigation which follows.

(C) CLINICAL INVESTIGATION

The composition according to the invention was successfully administered, under its various forms, to many patients exhibiting painful syndromes of varied origins. Its antalgic action, combined with its anti-inflammatory and anti-thermal effects, make it possible for the composition to produce a substantial sedation on most varied painful syndromes, whether these are related or not to systemic inflammatory or hyperthermal reactions.

The daily dosage regimen used was of 2 to 6 for tablets, coated tablets or capsules, 2–4 tea- or table-spoonfuls for syrup, 1–2 for injectable ampoules, and 1–3 for suppositories.

From the standpoint of clinical tolerance, administration of the composition was accompanied by no tolerance or pain, and neither irritation or side-effects were ever noted.

Similarly, biological control tests have shown the perfect tolerance of the product.

CASE REPORT NO. 1

Mr. René B . . . , aged 26, complains of right cervicalgia irradiating in the right m. trapezius, that occurred after a false movement.

He was administered 3 tablets daily of formulation No. 2 mentioned above, during 5 days. Total sedation at the beginning of the 3rd day.

Results and tolerance: excellent.

CASE REPORT NO. 2

Mr. Marcel L . . . , aged 22, suffers from a wisdom tooth condition. Intense pain appeared on a Saturday evening, irradiating in the territory of the trigeminal nerve.

He was prescribed 6 coated tablets daily of above formulation No. 1, during 2 days. As early as the first dose, the pain is strongly attenuated after 45 minutes and disappears completely after the 2nd dose, and does not reappear. The wisdom tooth is extracted two days later.

Results and tolerance: excellent.

CASE REPORT NO. 3

Mr. Claude V . . ., aged 28, consults for violent pain due to an acute congestive otitis.

In combination with penicillin injections, he is administered the composition of formulation No. 3 set forth above, at a daily dosage of 6 capsules.

Most marked improvement occurs as early as the first dose: 15 minutes after ingestion of 2 capsules, the pain disappears during 3 hours. Sedation is complete on the 2nd day.

Results and tolerance: excellent.

CASE REPORT NO. 4

Mr. Jean C . . ., aged 47, exhibits a zona of the left shoulder and arm accompanied by violent pain during sleep which is most difficult.

In association with a curative treatment, he is administered the composition of above mentioned formulation No. 5, at the rate of one daily intra-muscular injection, during one week.

Pain decreases as early as the first injection and disappears entirely within 6 days.

Tolerance and results: excellent.

CASE REPORT NO. 5

Mr. Georges P . . ., aged 81, exhibits a fracture of the collum femoris, treated by extension. He suffers from intense pain, at the level of both coxo-femoral joints, producing most distressing insomnia.

He is prescribed the composition of above mentioned formulation No. 7, at the dosage of 1 suppository morning and evening. Sedation is almost complete as early as the first dose, and is complete on the 3rd day.

Results and tolerance: excellent.

CASE REPORT NO. 6

Mr. Germain S . . ., aged 23, ten days previously experienced, during an effort, acute pain at the level of the lumbar area of the spinal column, with ephemeral irradiation in the right buttock which kept him in bed during 7 days. Clinically, examination discloses vivid pain on pressure of $L_4$–$L_5$ and a limitation of the movements of the lumbar spinal column. X-day examination discloses only a slight pinching of the disk at $L_4$–$L_5$.

Administration of the composition of above mentioned formulation No. 6, at the daily dosage of one intramuscular injection, produces an abatement of the pain which disappears entirely on the 5th day.

Results and tolerance: excellent.

CASE REPORT NO. 7

Mr. Raoul V . . ., aged 23, suffered from a lumbar trauma, 3 years previously, during a rugby game. Treated until now by physiotherapy and the usual antalgic drugs, the pains reappear subsequently, on several occasions, during various efforts. Sudden aggravation occurred while Mr. V . . . was attempting to lift a cupboard: he felt a severe pain in the right thigh and calf. Auscultation evidences a Lasègue's sign of 30° to the right, and a contralateral Lasègue's sign, of 45° to the left. Reflexes are normal. Clinically, this is a radiculalgia of $L_5$ type. X-ray shows injuries due to stagewise lumbar diskal conditions. He is prescribed the composition of above mentioned formulation No. 1, at the daily dosage of 6, during 15 days. Sedation sets in on the 3rd day. It is complete after 10 days of treatment and does not reappear.

Results and tolerance: excellent.

CASE REPORT NO. 8

Mr. Henri F . . ., aged 54, has been suffering, for the past month, from a lumbar pain which impairs considerably his general activity and makes both standing and sitting painful.

Examination discloses a decrease of the lumbar dynamics and an exacerbation of pain on pressure of the processi spinosi, particularly of $L_4$ and $L_5$. Considerable lumbarthrosis is found on X-ray examination.

He is administered the syrup of above mentioned formulation No. 4, at the daily dosage of 6 table-spoonfuls, during 10 days. As early as the first dose, sedation occurs within 40 minutes and persists during five hours. On the 8th day, the algias and the functional impotence have completely disappeared.

Results and tolerance: excellent.

CASE REPORT NO. 9

Mrs. Marie P . . ., aged 65, suffers from an algia of the right half-face that set in in 1961. X-ray examination shows an opacity of the right maxillary sinus with bone involvement of the internal area. The severe pain is resistant to the usual antalgic drugs.

She is administered the composition of above mentioned formulation No. 2, at the daily dosage of 4, during 20 days.

Although gradual, sedation is marked. It becomes complete on the 15th day and the pains do not reappear after interruption of the treatment.

Results and tolerance: excellent.

CASE REPORT NO. 10

Child Alain S . . ., aged 4, exhibits a characteristic influenza syndrome, with stiffness, headaches, congestion of the higher respiratory tract and hyperthermia at 38.8° C.

He is administered the composition of above-mentioned formulation No. 8, at the daily dosage of 2, during 6 days.

As early as the 2nd day of treatment, the clinical and subjective signs are markedly improved. Healing is complete on the 4th day.

Results and tolerance: excellent.

The results of the present clinical investigation show that:

(a) Treatment with the composition according to the invention profits from excellent clinical tolerance; during oral treatments, even of extended duration, no disorders of gastric type are found to occur.

(b) Biological tolerance is satisfactory. Regularly effected control tests have shown that the product produces no detectable hematologic involvement, particularly where methemoglobin is concerned. In addition, there were noted neither substantial variations in the blood urea and cholesterol levels, nor perturbations of the hepatic tests.

(c) The clinical efficiency of the composition according to the invention is excellent in the treatment of painful syndromes of varied origins, accompanied or not with systemic inflammatory and hyperthermal manifestations.

It is applicable in radiculites such as cervico-brachial neuralgia, intercostal neuralgia, lumbo-sciatica, sciatica, in lumbalgia, zona, sequelae of surgical operations, facial sympathalgia, rheumatism, trauma sequelae, phenonema of varied etiology such as headaches, dental pains and dysemenorrhea.

Having now described my invention what I claim as new and desire to secure by Letters Patent is:

1. 1 - propionamido - 4 - (3-propoxy-sodium-sulfonate) benzene of formula:

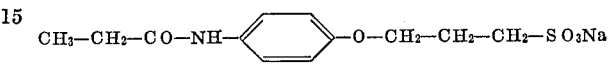

References Cited

UNITED STATES PATENTS 3,346,628  10/1967  Riezebos et al. _____ 260—507

DANIEL D. HORWITZ, Primary Examiner

U.S. Cl. X.R.

424—315